United States Patent
Narcus

(10) Patent No.: US 7,810,385 B1
(45) Date of Patent: Oct. 12, 2010

(54) PROCESS FOR DETERMINING A REMAINING CREEP LIFE FOR A TURBINE COMPONENT

(75) Inventor: Andrew R Narcus, Loxahatchee, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 317 days.

(21) Appl. No.: 12/195,240

(22) Filed: Aug. 20, 2008

(51) Int. Cl.
*G01M 15/14* (2006.01)
(52) U.S. Cl. .................................................. 73/112.01
(58) Field of Classification Search ............. 73/112.01, 73/112.03, 112.05
See application file for complete search history.

(56) References Cited

U.S. PATENT DOCUMENTS

| | | | | |
|---|---|---|---|---|
| 4,812,052 A * | 3/1989 | Adam et al. | .................. | 374/50 |
| 5,042,295 A * | 8/1991 | Seeley | ..................... | 73/112.03 |
| 5,455,777 A * | 10/1995 | Fujiyama et al. | ............. | 702/34 |
| 6,082,198 A * | 7/2000 | Sabourin et al. | ............. | 73/633 |
| 6,983,659 B2 * | 1/2006 | Soechting et al. | ............. | 73/802 |
| 7,104,120 B2 * | 9/2006 | Gladden | .................. | 73/114.77 |
| 7,552,647 B2 * | 6/2009 | Soechting et al. | ............. | 73/802 |
| 2004/0139809 A1 * | 7/2004 | Soechting et al. | .......... | 73/865.9 |
| 2005/0193810 A1 * | 9/2005 | Gladden | .................. | 73/119 R |
| 2009/0133381 A1 * | 5/2009 | Holmes et al. | ................ | 60/204 |

* cited by examiner

Primary Examiner—Eric S McCall
(74) Attorney, Agent, or Firm—John Ryznic

(57) ABSTRACT

A process for determining a remaining useful life for a turbine airfoil that suffers from creep damage in order to reuse a component that still has acceptable remaining life. The process includes the steps of removing the damaged component, scanning the damaged component with an optical scanner such as a white light scanner to produce a 3D solid model of the damaged component, scanning a new or undamaged used component to produce a 3D solid model of the undamaged component, comparing the two 3D solid models to determine the amount of creep damage on the damaged component, determining the length of time the creep damaged component was used and the temperature at which it was exposed, and analyzing the 3D solid model of the creep damaged component to determine how much longer the part can be used before the component will suffer critical damage or the engine will suffer unacceptable performance.

17 Claims, 2 Drawing Sheets

PROCESS FOR DETERMINING A REMAINING CREEP LIFE FOR A TURBINE COMPONENT

FEDERAL RESEARCH STATEMENT

None.

CROSS-REFERENCE TO RELATED APPLICATIONS

None.

BACKGROUND OF THE INVENTION

1. Field of the Invention

The present invention relates generally to a process for determining a remaining life of a component suffering from creep due to operation of the component (or, part) under relatively high centrifugal or thermal loads, and more specifically to a process for determining a remaining life of an airfoil such as a rotor blade or a stator vane suffering from creep due to operation under relatively high centrifugal or thermal loads from operation in a gas turbine engine.

2. Description of the Related Art Including Information Disclosed Under 37 CFR 1.97 and 1.98

High temperature and stress are common operating conditions for various parts in a gas turbine engine, such as rotor blades and stator vanes in the compressor or the turbine. Creep and stress rupture are some principal types of elevated temperature mechanical failure modes. Generally, the type of failure is established by examination of fracture surfaces and comparison of component operating conditions with available data on creep, stress rupture, tension, elevated temperature fatigue and thermal fatigue properties.

Creep deformation can produce large changes in the dimensions of a part to either render the part useless for further service or cause fracture. In an airfoil used in a gas turbine engine, excessive creep can cause the airfoil to untwist—which would reduce the aerodynamic efficiency of the airfoil—or can cause the airfoil (if it is a rotor blade) to rub excessively against the blade outer air seal (BOAS). Creep is also responsive for causing grain boundary cavitations, which leads to micro cracks that eventually lead to full size cracks that can cause fracture. Thus, excessive creep deformation causes the material to reach or exceed some design limit on strain, which is referred to as creep failure. In a gas turbine engine, creep failure can be the bowing of a stator vane due to excessive thermal and pressure loads occurring on the vane or creep crack in a turbine vane.

Creep deformation can also lead to fracture of an airfoil. Fracture can occur from either localized creep damage or more widespread bulk damage caused by the accumulation of creep strains over time. Structural components that suffer from bulk creep damage typically are exposed to uniform loading and uniform temperature distribution during the operating life. This type of failure is referred to as stress rupture or creep rupture.

Failures from creep deformation depend on the alloy, the time-temperature exposure, loading conditions, component geometry, and also environmental and metallurgical factors. Corrosion, fatigue or material defects can also contribute to creep and stress-rupture defects. Creep deformation becomes important when mechanical strength of a metal becomes limited by creep rather than by yield strength. This transition in engineering design is not directly related to melting temperature. The temperature at which the mechanical strength of a metal becomes limited by creep, rather than by elastic limit, must be determined individually for each metal or alloy.

Constant load bulk deformation creep curves typically consist of three distinct stages as seen in FIGS. 1 and 2. FIG. 1 is a strain curve for the three stages of creep under constant-load testing and constant-stress testing. FIG. 2 shows the relationship of strain rate, creep rate, and time during a constant-load creep test. The minimum creep rate is attained during second-stage creep. The first stage is called primary creep and is the region of the initial instantaneous elastic strain from the applied load. The region of secondary creep is where the creep rate is nominally constant at a minimum rate and is generally known as the minimum creep rate. The third and last stage is the region of tertiary creep, where drastically increased strain rate with rapid extension to fracture occurs.

In a gas turbine engine, such as an industrial gas turbine (IGT) or an aero gas turbine engine, airfoils such as rotor blades and stator vanes in the turbine or compressor sections are exposed to extremely high centrifugal or thermal loads during engine operation. In the turbine section, the rotor blades are exposed to relatively high thermal and centrifugal loads as well as pressure loads. As mentioned above, when an engine part, such as a rotor blade in the turbine, suffers from excessive creep, the blade can untwist to the point where the aerodynamic efficiency of the blade is decreased, the blade can rub excessively against the blade outer air seal, or the blade can fracture due to crack growth. In either case, it would be beneficial for the engine operator to know if a certain engine part such as the rotor blade still has any remaining useful life when the engine is shut down and the parts are inspected for damage. Especially in an industrial gas turbine engine, which operates for long periods of time between shutdowns, reusing a damaged part will cause loss of efficiency or even engine damage due to part failure.

BRIEF SUMMARY OF THE INVENTION

It is an object of the present invention to determine the remaining useful life of a part that suffers from creep.

It is another object of the present invention to reduce the cost of operating a gas turbine engine.

It is another object of the present invention to extend the life of a gas turbine engine.

The present invention is a process for determining a remaining life of a component exposed time-temperature and loading that can cause excessive creep. The engine component suffering from creep is removed from the engine and placed on a structure in which the component is scanned with an optical scanner (such as a white light scanner) to accurately produce a 3D solid model of the component including the damage caused by the creep. The optical scanner is capable of detecting the length of the creep on the component with a high level of accuracy of within around 0.001 inches. The 3D model of the damaged component is then compared to a 3D model of a new component (component with no damage) to determine how much damage due to creep has occurred on the component. The 3D model of the new component can be the original component that is scanned before being used in the engine or can be a new but unused component similar to the used component suffering from the damage.

Next, the length of time in which the damaged component was used in the engine is determined such as from the operating log of the engine. With the amount of damage due to creep on the component known and the length of time in which the damage occurred, the remaining life of the component can be determined from creep test results in tables of the material or from past experiments that compare the amount of creep based upon the time exposure under the specific operating conditions in which the component was exposed.

The 3D model of the damaged component can also be analyzed using a finite element analysis to determine if the damaged component is structurally capable of being used under the known engine operating conditions. An engine part such as a vane or blade that has suffered excessive creep may have become untwisted to the point where the aerodynamic efficiency is compromised. Or, a portion of the vane or blade may have become weakened due to necking or the appearance of a crack. An analysis can be performed to determine the potential detrimental effects and expected life of the deteriorated component or airfoil as well as the remaining useful life of the component with the damage.

With the amount of creep damage determined, the damaged component can then be reanalyzed to determine how much more creep growth can occur on the component before the component will become unusable such as from increased length or when the component will fracture. Therefore, a component suffering from creep can be analyzed to determine what the remaining useful life for the component is. If the component has significant remaining life, then the component can be reused. If it is determined that the remaining life is limited, then the component can be discarded. Prior to scanning the damaged component, a new component configuration can be scanned before being placed into service in order to produce a 3D model of the unused component before any damage from creep occurs. In another embodiment, a similar new but unused component to the damaged component can be scanned for the comparison to determine how much damage has occurred to the used component.

The damaged components in which the process of the present invention can be used is for gas turbine engine components exposed to the time-temperature and loads due to pressure or centrifugal forces, such as the compressor blades and vanes and turbine blade and vanes. The process is not limited to components used in a gas turbine engine but could be applied to other components that are exposed to temperature or loading that produces creep.

DETAILED DESCRIPTION OF THE INVENTION

Figure 1:
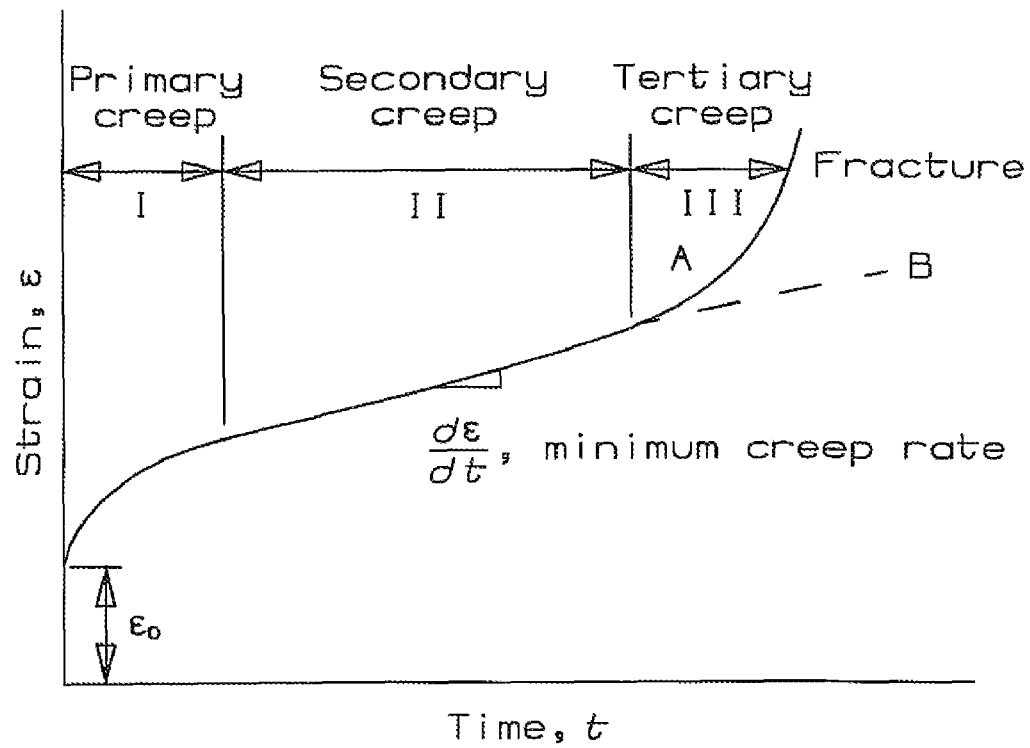
FIGS. 1 and 2 shows a table of strain versus time for the three stages of creep.
Figure 2:
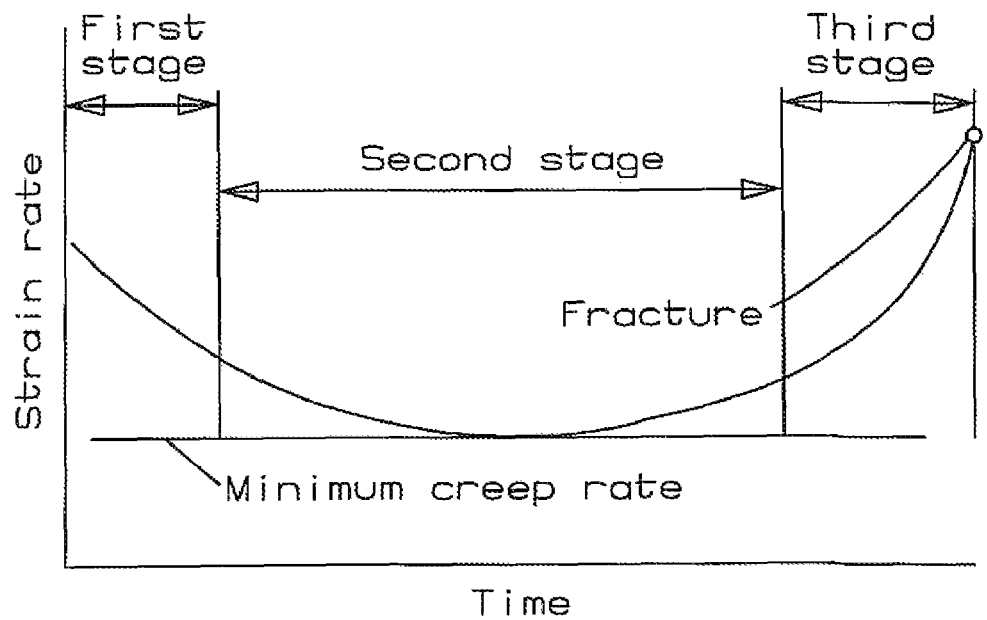
Figure 3:
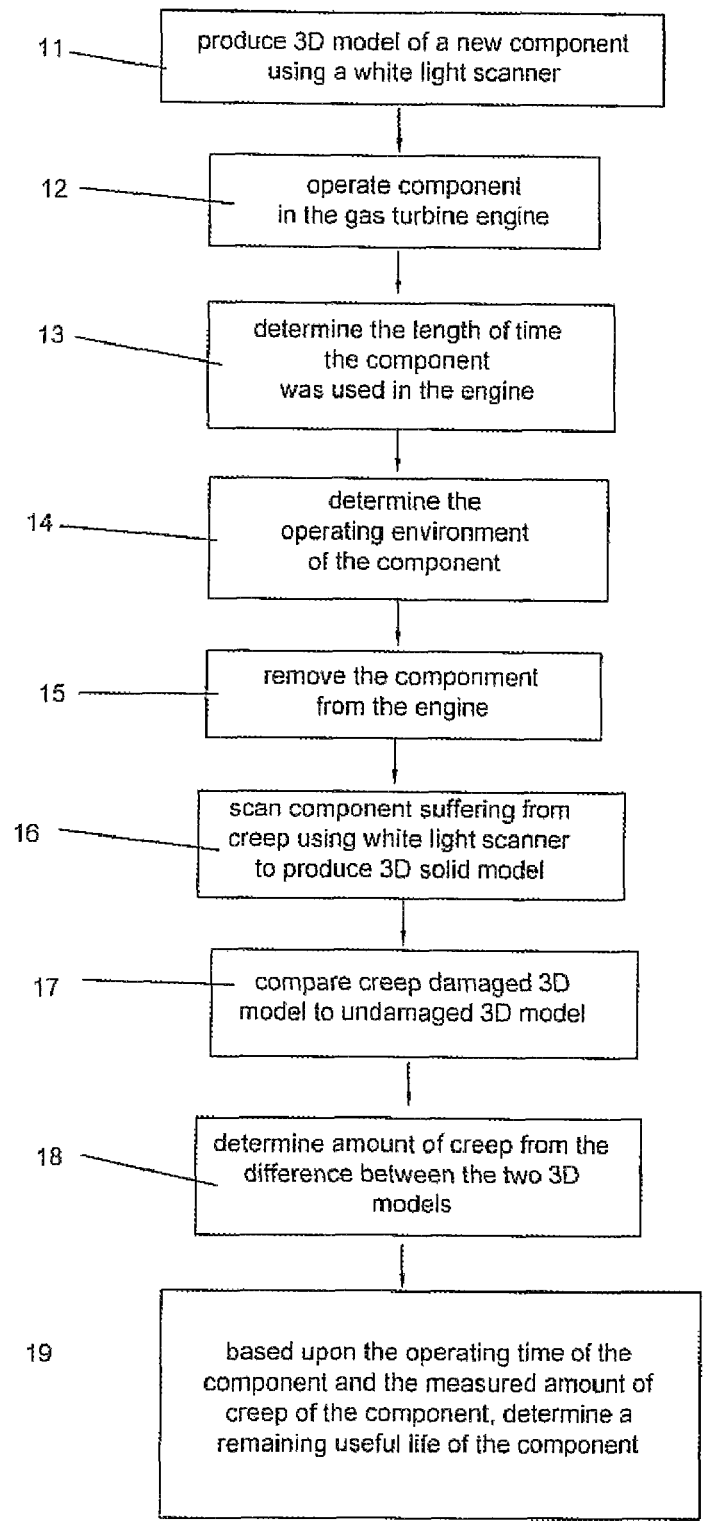
FIG. 3 shows a flowchart for the process of determining a remaining useful life for an airfoil suffering from creep.

The process for determining a remaining life of a component damage due to creep from use in a high temperature environment is intended to be for a turbine airfoil such as a stator vane or a rotor blade. However, the process could be used for other components in a gas turbine engine such as shrouds or parts within the compressor, or for other components used in an apparatus other than a gas turbine engine. The process is shown in FIG. 3 in which the first step 11 is to scan a component of interest, for example a turbine rotor blade, using an optical scanner (such as a white light scanner) and produce a 3D solid model of the component. A white light scanner is capable of producing a 3D model of such fine detail (in the order of 0.001 inches) that even small cracks will show on the solid model. In step 11, the component that is scanned is the component that will be placed into the engine or environment (step 12) in which the damage due to creep will occur. Thus, a 3D solid model of the component is obtained before the component undergoes any damage. In another embodiment, a new component similar to the used and damaged component can be scanned in order to compare the damaged component with the undamaged component. A 3D solid model of the component is needed in order to use the finite element analysis program to analyze the component.

After the component has undergone exposure in the engine to the high temperature environment that will cause the creep damage, the component is removed from the engine (step 15) and scanned again to produce a 3D model of the damaged component (step 16). An optical scanner such as a white light scanner is used to produce the 3D model because it can reproduce on the model the amount of creep occurring including an increase in the length and an untwisting of the component. From the scanned solid model, the amount of creep can be determined by comparing the original undamaged solid model of the component with the solid model showing the damage (step 17).

In another embodiment, instead of scanning the original component prior to placement in the engine, a new component to the damaged component can be scanned at any time for comparison to the damaged component. The new component is considered to be the same kind of part as the damaged part, but one that is not suffering from the damage such that any changes occurring on the damaged component can be detected by comparing the two components. In the case of a turbine blade, for example, the first stage of the turbine may have 20 blades all formed from the same casting so that the blades are basically identical. This would be considered as the same kind of part or the same blade. For example, if the original new component was not scanned prior to the damage occurring, a new component having the same dimensions and size can be obtained and scanned for comparing to the damaged component.

When the undamaged solid model is compared to the damaged solid model, the differences can be determined that will represent the amount of damage occurred on the component (step 18). During the component's use—when the damage was done—the length of time and the operating conditions of the component such as the temperature is noted for use in determining the component's remaining life. For example, the length of time that the component was exposed in the engine is noted. With the length of time that the component was undergoing the creep damage and the amount of damage done on the component for that length of time, the amount of remaining useful life for that component can then be determined (step 19). In determining the remaining life of a component suffering from creep, the part is inspected for evidence of creep in areas that would be high stress locations. Some areas of the component might have primary creep while another area might have secondary creep occurring. Secondary creep is the precursor to tertiary creep which is the final stage of creep where rupture occurs as seen in FIG. 3. When a key section of the component is well into the secondary creep stage, then the component is probably at the end of life since much more use will probably result in damage to the component. A non-critical area of the component that suffers from secondary creep will still have sufficient life remaining for the component to be reused under normal operating conditions.

Material property tables are available that plot the amount of creep that will occur for a certain metal or alloy under certain temperature conditions. Each metal or alloy will have data such that the graph of the kind in FIG. 3 will be available representing the creep versus time under these operating conditions. The amount of creep that occurs on the actual part being analyzed can be compared to the graph of the material to determine where on the graph the actual part is. Then, the remaining life can be determined from the graph.

When the amount of creep on the part is known, the part can also be modeled in the computer analysis to determine how much additional growth will occur to the point where a rotor blade will start to produce excessive rub. If this time period is too short for operation in the engine, then the part can be discarded and replaced with a new part or a used part that will meet the minimum life requirement. The computer analysis can also be used to determine when the part will fracture due to continuous creep under the known engine operating conditions. Also, the amount of additional untwisting of the part can be determined using additional computer analysis in order to determine the remaining part life before the twist becomes excessive and the aerodynamic efficiency of the part is unacceptable.

I claim the following:

1. A process for determining a remaining life of a high temperature component having damage due to creep, the process comprising the steps of:
   Scanning the damaged component to produce a 3D solid model of the damaged component;
   Scanning a new component of the damaged component with an optical scanner to produce a 3D solid model of the new component;
   Determining the length of time and the temperature that the damaged component was undergoing the creep;
   Comparing the damaged component 3D solid model to the new component 3D solid model to determine the amount of creep occurring on the damaged component; and,
   From the length of time that the damaged component was undergoing the creep, determining a remaining useful life of the damaged component.

2. The process for determining a remaining life of a high temperature component of claim 1, and further comprising the step of:
   The step of scanning a new component includes scanning the damaged component before the damaged component has been used in the operating environment that produces the creep damage.

3. The process for determining a remaining life of a high temperature component of claim 1, and further comprising the step of:
   The step of scanning a new component includes scanning a new component that is not the same damaged component.

4. The process for determining a remaining life of a high temperature component of claim 2, and further comprising the step of:
   The optical scanner is an optical scanner capable of reproducing details on the component of around 0.001 inches.

5. The process for determining a remaining life of a high temperature component of claim 4, and further comprising the step of:
   The optical scanner is a white light scanner.

6. The process for determining a remaining life of a high temperature component of claim 1, and further comprising the step of:
   The step of determining a remaining useful life of the damaged component includes analyzing the damaged component 3D solid model using a finite element analysis program.

7. The process for determining a remaining life of a high temperature component of claim 6, and further comprising the step of:
   The step of determining a remaining useful life of the damaged component includes performing a thermal and a structural analysis of the damaged component 3D solid model.

8. The process for determining a remaining life of a high temperature component of claim 1, and further comprising the step of:
   The step of comparing the two 3D models includes determining an amount of blade untwist has occurred on an airfoil.

9. The process for determining a remaining life of a high temperature component of claim 1, and further comprising the step of:
   The step of comparing the two 3D models includes determining an increase in length of an airfoil.

10. The process for determining a remaining life of a high temperature component of claim 9, and further comprising the step of:
    The step of comparing the two 3D models includes determining how much longer the airfoil can be used before excessive tip rubbing occurs.

11. The process for determining a remaining life of a high temperature component of claim 1, and further comprising the step of:
    The step of comparing the two 3D models includes determining the length of time before the component will fracture due to creep growth.

12. The process for determining a remaining life of a high temperature component of claim 1, and further comprising the step of:
    The scanned component is a component used in a gas turbine engine.

13. The process for determining a remaining life of a high temperature component of claim 12, and further comprising the step of:
    The scanned component is a turbine airfoil.

14. The process for determining a remaining life of a high temperature component of claim 12, and further comprising the step of:
    The scanned component is a compressor airfoil.

15. The process for determining a remaining life of a high temperature component of claim 1, and further comprising the step of:
    The step of determining a remaining useful life of the damaged component includes determining if secondary stage creep is occurring in a critical stress area of the component.

16. A process of refurbishing a gas turbine engine comprising the steps of:
    Shutting down the gas turbine engine;
    Removing a component from the gas turbine engine that is exposed to creep damage suffered from being used in the gas turbine engine;
    Determining a remaining useful life of the damaged component according to the process of claim 1; and,
    Re-using the damaged component in the gas turbine engine if the remaining useful life is longer than a certain time period and replacing the damaged component if the remaining useful life is not longer than the certain time period.

17. The process of refurbishing a gas turbine engine of claim 16, and further comprising the step of:
    The damaged component is a turbine rotor blade, or a turbine stator vane, or a compressor blade, or a compressor vane.

* * * * *